US012296581B2

(12) United States Patent
Sole Enrech et al.

(10) Patent No.: US 12,296,581 B2
(45) Date of Patent: May 13, 2025

(54) CONTROLLING TENSION OF A MEDIA DURING PRINTING

(71) Applicant: Hewlett-Packard Development Company, L.P., Spring, TX (US)

(72) Inventors: Luis Sole Enrech, Sant Cugat del Valles (ES); Ricardo Oltra Ramirez, Sant Cugat del Valles (ES); Jose Angel Villasante Bembibre, Sant Cugat del Valles (ES); Alex Rius Laorden, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 113 days.

(21) Appl. No.: 18/006,465

(22) PCT Filed: Jul. 24, 2020

(86) PCT No.: PCT/US2020/043381

§ 371 (c)(1),
(2) Date: Jan. 23, 2023

(87) PCT Pub. No.: WO2022/019916

PCT Pub. Date: Jan. 27, 2022

(65) Prior Publication Data

US 2023/0264497 A1 Aug. 24, 2023

(51) Int. Cl.
*B41J 15/16* (2006.01)

(52) U.S. Cl.
CPC .................................... *B41J 15/16* (2013.01)

(58) Field of Classification Search
CPC ...... B41J 15/16; B41J 11/009; B41J 11/0095; B65H 2801/12; B65H 23/044; B65H 23/048; B65H 23/188
See application file for complete search history.

(56) References Cited

U.S. PATENT DOCUMENTS

| | | | |
|---|---|---|---|
| 9,296,228 B2 | 3/2016 | Regelsberger et al. | |
| 2011/0279867 A1 | 11/2011 | Okura et al. | |
| 2017/0106676 A1 | 4/2017 | Takahashi et al. | |
| 2017/0106682 A1 * | 4/2017 | Akahane ................ | B65H 23/16 |

(Continued)

FOREIGN PATENT DOCUMENTS

| | | |
|---|---|---|
| CN | 103193102 A | 7/2013 |
| CN | 110217630 A | 9/2019 |

(Continued)

OTHER PUBLICATIONS

Bonjoch Roma Ignasi et al. (WO 2020122858), Adjusting Tension of a Substrate, Jun. 18, 2020, [Paragraphs 0011, 0029, 0033-0038] (Year: 2020).*

*Primary Examiner* — Lisa Solomon
(74) *Attorney, Agent, or Firm* — Jordan IP Law, LLC

(57) ABSTRACT

The disclosure relates to a method of controlling tension of a media during printing. The media is tensioned by supporting a dancer bar coupled at a first end to a first dancer arm which moves about a first pivot. The tension is provided by resisting a net moment acting on the first dancer arm. The method comprises applying a first setting force to the first dancer arm to set the net moment acting on the first dancer arm and adjusting the first setting force to alter the net moment acting on the first dancer arm.

15 Claims, 6 Drawing Sheets

(56) References Cited

U.S. PATENT DOCUMENTS

| | | | |
|---|---|---|---|
| 2017/0344842 | A1 | 11/2017 | Perez et al. |
| 2020/0071113 | A1 | 3/2020 | Hamano et al. |

FOREIGN PATENT DOCUMENTS

| | | | | |
|---|---|---|---|---|
| EP | 2927007 | A1 | 10/2015 | |
| EP | 3354609 | A1 | 8/2018 | |
| JP | 2016-074510 | A | 5/2016 | |
| JP | 2020-011801 | A | 1/2020 | |
| KR | 10-2009-0124486 | A | 12/2009 | |
| KR | 10-2010-0001879 | A | 1/2010 | |
| WO | 2014/050775 | A1 | 4/2014 | |
| WO | 2016/158016 | A1 | 10/2016 | |
| WO | WO-2020122858 | A1 * | 6/2020 | .............. B41J 11/46 |

* cited by examiner

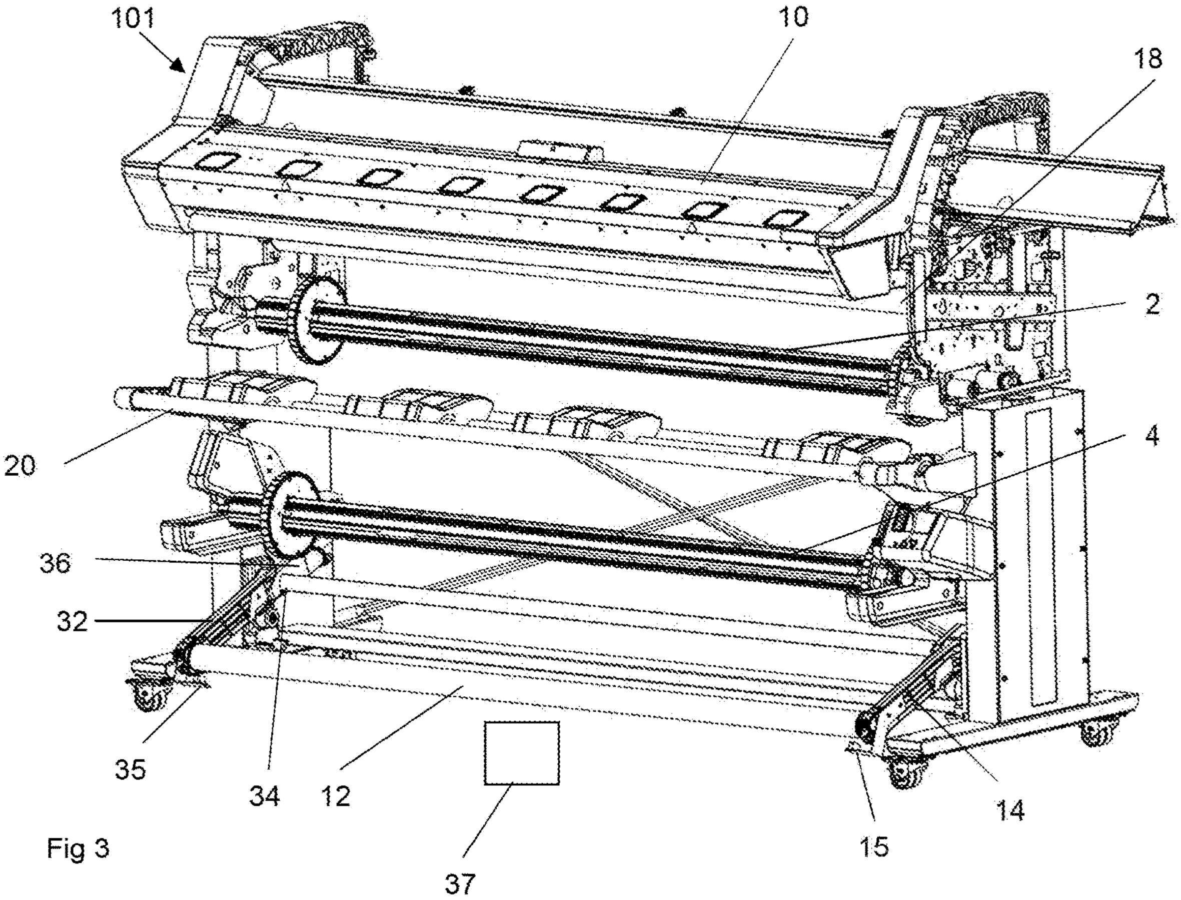
Fig 3
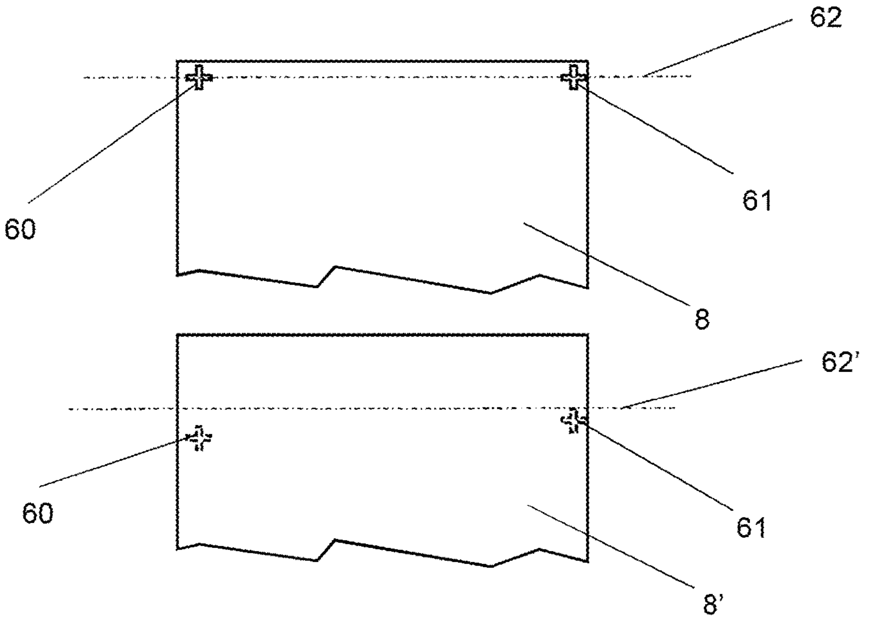
Fig 7a
Fig 7b

CONTROLLING TENSION OF A MEDIA DURING PRINTING

Some printers which draw media from an input roll, print onto that media as it passes through a printing station and subsequently draw that media onto an output roll can control tension of the media during printing using a dancer bar which is coupled to a dancer arm which is, in turn, rotatable about a pivot. Tension exerted on the media during printing is determined by the net moment acting on the dancer arm that is resisted by the media as it advances through the printer. The media resists the net moment acting on the dancer arm by supporting the dancer arm during printing and the tension thus provided ensures that the media is rolled appropriately onto the output spindle.

Examples of the present disclosure will be described with reference to the accompanying Figures, in which:

FIG. 3 shows a perspective view of the example printer of FIG. 1;

FIGS. 7*a* and 7*b* shows an example of media including fiducial marks at different times during the printing process.

Figure 1:
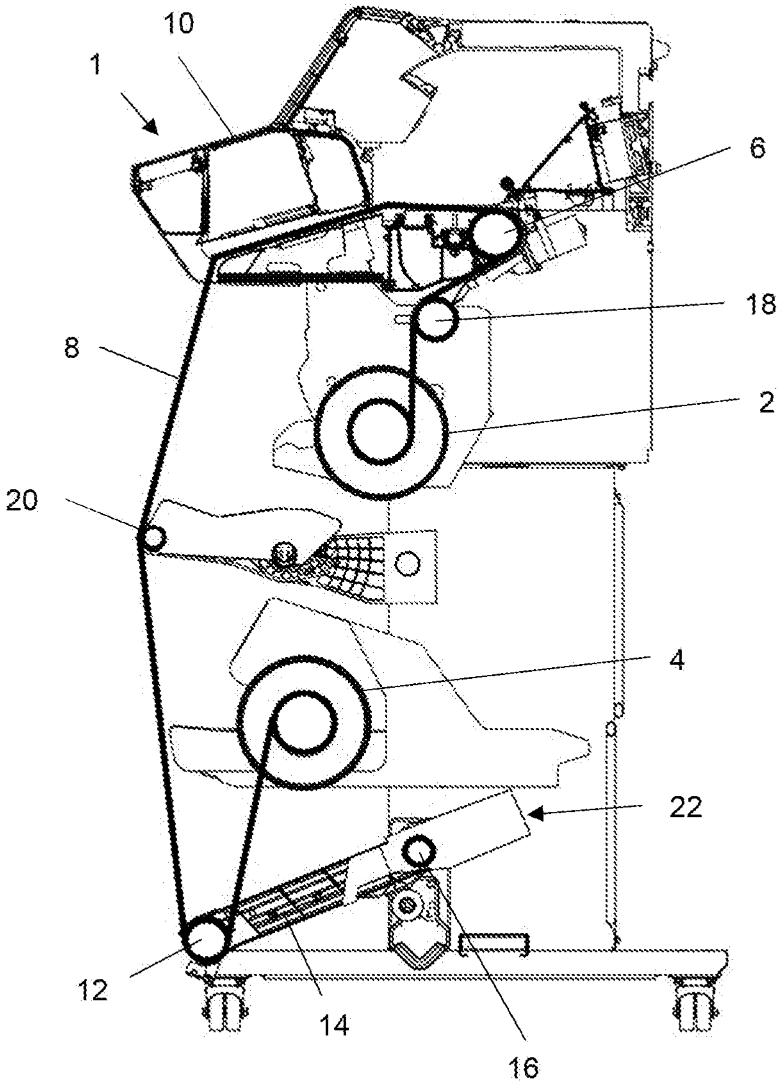
FIG. 1 shows a side view of an example printer which controls tension of a media during printing.

FIG. 1 shows a side view of an example printer 1 which controls tension of a media 8 during printing. The printer 1 comprises an input spindle 2 carrying the media 8 for printing and an output spindle 4 for collecting media 8 once printed. The media 8 may be provided in a roll which is threaded onto, or otherwise carried by, the input spindle 2. Once printed the media 8 may be drawn into a roll around the output spindle 4 for subsequent removal.

A path that the media 8 takes through this example of a printer 1 is shown in the figure. Media 8 is drawn from the input spindle 2 in a clockwise direction (according to the view shown) by a drive spindle 6, is driven in an anti-clockwise direction around the drive spindle 6 and towards a front of the printer 1 past a print station 10 including a printer head and heat source, downwards from the print station 10 over the front of the printer 1 towards a dancer bar 12, in an anti-clockwise direction around the dancer bar 12, and finally drawn upwards and around an output spindle 4 in a clockwise direction. The media 8 is also guided around a plurality of supports such as support spindle 18 and support arm 20 which help to control movement of the media 8 through the printer 1.

In this example input spindle 2, drive spindle 6, dancer arm 12 and output spindle 4 together control movement of the media 8 through the printer 1. Drive spindle 6 draws the media 8 from input spindle 2 and the input spindle 2 applies a braking force to the media 8 to control the tension of the media 8 between the input spindle 2 and drive spindle 6. The braking force may be applied by a motor which acts to resist rotation of the input spindle 2 as media 8 is being drawn from the input spindle 2 (in this view media is drawn from the spindle in an anti-clockwise direction).

The media 8 passes from the drive spindle 6 through a print station 10, passes under a dancer bar 12, and is coupled to output spindle 4. The dancer bar 12 is supported by the media 8 so that the dancer bar 12 creates tension in the media 8 between the drive spindle 6 and the output spindle 4.

Dancer bar 12 is coupled at a first end to a first dancer arm 14 which is moveable about a first pivot 16. The dancer bar 12 is therefore rotatable about first pivot 16 and exerts an anti-clockwise moment on the dancer arm 14. As the media is wrapped under, and supports, the dancer bar 12, the anti-clockwise moment acting on the dancer arm 14 exerts a downward force on the media 8 and draws media from the drive spindle across the front of the printer 1.

During printing, if the output spindle 4 is stopped or, in other examples, is drawing media 8 in at a rate below the rate at which media 8 is being provided by the input spindle 2, the length of media 8 between the drive spindle 6 and the output spindle 4 increases and the dancer bar 12 falls.

When the dancer bar 12 reaches a lower threshold, the output spindle 4 is activated or, in other examples, the output spindle speed is increased so that its media 8 draw rate is increased. Upon activation, the output spindle 4 begins to rotate and draw the media 8 upwards and around the output spindle 4, collecting the media 8 at a rate exceeding the rate at which media 8 is being provided. In so doing, the length of media 8 between the drive spindle 6 and the output spindle 4 decreases and the dancer bar 12 rises.

When the dancer bar 12 reaches an upper threshold, the output spindle 4 is de-activated, or slowed, and the dancer bar 12 once again falls. In this example the rising and falling of the dancer bar 12 is a cyclical process.

In this example, the dancer arm 12 is detected as having reached the lower and upper thresholds by sensors, in this examples contact sensors, and the output spindle 4 may be activated by an on/off switch in response to data received by the sensors. In other examples the position of the dancer arm may be detected by a different sensor. The sensor may comprise a proximity sensor, optical sensor, angle sensor, any other suitable sensor or combinations of sensors for detecting or inferring position of the dancer arm 14.

The accuracy of printing of the media 8 may depend upon the alignment of the media 8 and print station 10 during printing and this is facilitated by the tension on the media 8 from supporting the dancer bar. The magnitude of the tension in the media created by the dancer bar 12 depends upon the net moment acting on the dancer arm 14 that is resisted by the media 8. The net moment is the sum of the moments acting on the dancer arm, excluding the moment resulting from the tension in the media 8. The net moment therefore depends upon the weight of the dancer bar 12, the weight of the dancer arm 14, and any other force applied to the dancer arm and their respective distances from the pivot 16. The net moment may also include a torque applied directly at the pivot, for example a braking force, or turning force, applied by a motor.

In this example the printer 1 includes a first adjuster 22. The first adjuster 22 allows the net moment acting on the first dancer 14 arm to be adjusted. Adjusting the tension in the media 8, for example reducing it by reducing the net moment acting on the dancer arm 14, can be used to reduce or avoid deformations in the media 8 that may occur during printing. The first adjuster 22 may comprise any suitable means for altering the net moment acting on the first dancer arm 14, for example a weight, spring, piston, motor, brake or a combination of of these, or other elements.

During printing it is possible for uniform and/or non-uniform deformations of the media 8 to occur. A uniform deformation may be one where the media is stretched such that the media increases in length by substantially the same amount along a length of the dancer bar 12 between the first and a second end (in other words, across a width of the media 8). A non-uniform deformation may be one where the media is stretched such that the media increases in length by different amounts along a length of the dancer bar 12 between the first and a second end. Such deformations may arise in media during printing as a result of, for example, the high temperatures used to cure printing ink, humidity from the printing ink and/or other factors.

In this example the first adjuster 22 is coupled to the first dancer arm 14 to apply a first setting force to the first dancer arm 14 to set the net moment acting on the first dancer arm 14. The first adjuster can adjust the first setting force to alter the net moment acting on the first dancer arm 14. Thus, in an example, the first adjuster 22 is able to set an initial tension exerted on the media by dancer bar 12 and alter the tension during printing.

Figure 2:
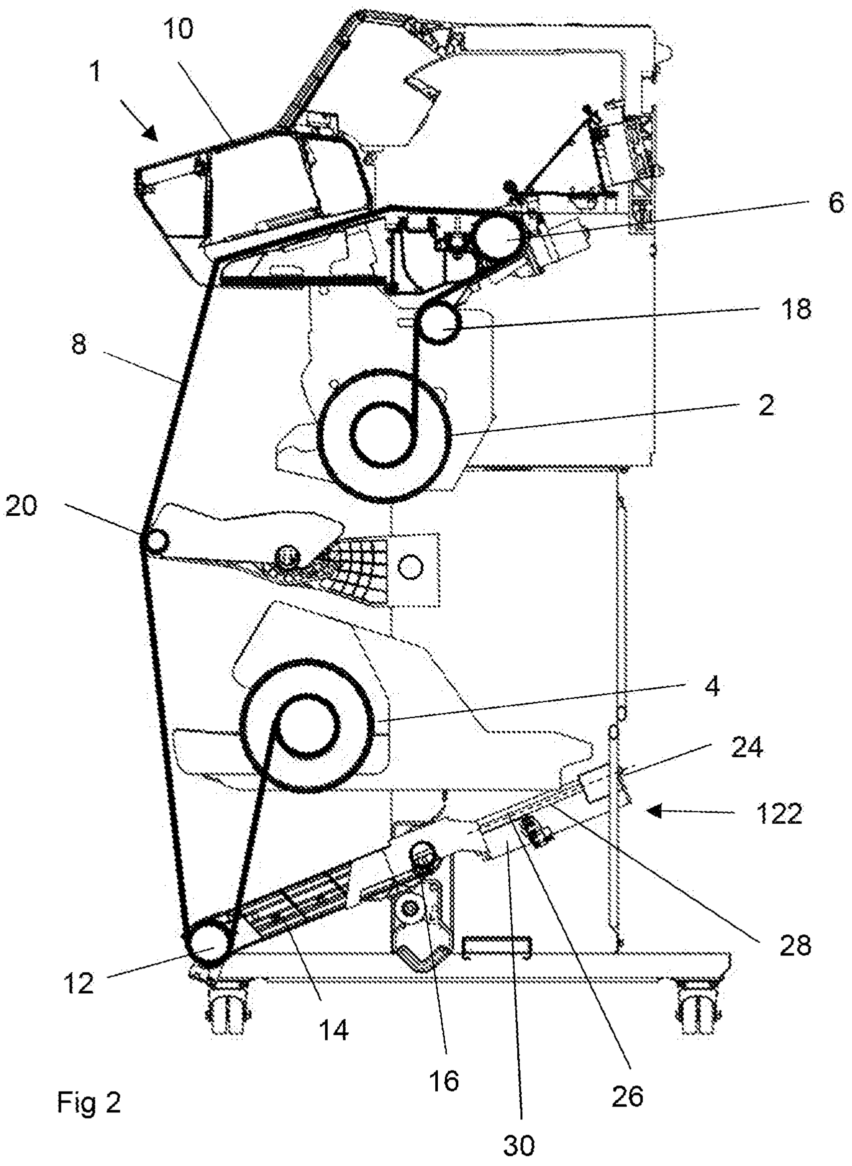
FIG. 2 shows a side view of example adjuster in the example printer of FIG. 1.

FIG. 2 shows a side view of example adjuster 122 in the example printer of FIG. 1. The example first adjuster 122 shown comprises a weight 24 movable relative to the first pivot 16. The first setting force is determined by the initial position of the weight 24 relative to the first pivot 16, and the first setting force is adjusted by moving the weight 24 relative to the first pivot 16. In this example, the weight 24 is coupled to a threaded bar 26, and the initial and subsequent positions of the weight 24 relative to the pivot 16 in this example are controlled by a motor 30. The motor 30 of this example rotates the threaded bar 26 via gears. The weight 24 is non-rotatable relative to the threaded bar 26 (for example, due to a restrictive interaction between the weight 24 and a housing, an example of which is described in more detail in relation to FIG. 5 below) and therefore rotation of the threaded bar 26 results in movement of the weight 24 along the threaded bar 26. Although movement of the weight 24 of this example is due to the action of a motor 30 and threaded bar 28, in other examples the weight 24 could be moved by other actuators, for example a piston, conveyor or linear motor.

The weight 24 in this example moves along an axis 26 directed longitudinally through the centre of the first dancer arm 14 and first pivot 16. In other examples the axis may be orientated in any other suitable direction.

The first adjuster 122 in this example is located on the opposite side of the first pivot 16 to the dancer bar 12, therefore the set net moment acting on the dancer arm 14 is less than the net moment that would act on the dancer arm 14 without an adjuster 22 attached thereto. To reduce the net moment acting on the first dancer arm 14, the weight 24 is moved in a direction away from the first pivot 16.

In other examples, the first adjuster may be located on the same side of the first pivot 16 as the dancer bar 12. In this case the set net moment acting on the first dancer arm 14 would be greater than the net moment that would otherwise act on the first dancer arm without an adjuster 122 attached thereto. In such examples moving the weight 24 in a direction away from the first pivot 16 would increase the net moment acting on the first dancer arm 14.

In yet other examples, the adjuster 122 may extend across the first pivot 16 such that the set net moment can be adjusted to be greater, or less, than the net moment acting on the dancer arm 14 without the adjuster 122 attached thereto.

Although the first adjuster 122 shown in FIG. 2 comprises a weight 24 threaded onto a threaded bar 26, the first adjuster 22 may comprise any mechanism that applies a first setting force to the first dancer arm 14 to set a net moment acting on the first dancer arm 14 and to adjust the first setting force to alter the net moment acting on the first dancer arm. Other example adjusters may include a weight the position of which is determined by a spring mechanism or piston, or may include a motor coupled to the first pivot which controls movement of the first dancer arm.

FIG. 3 shows a perspective view of an example printer 101 similar to the printer 1 of FIG. 1 with like features labelled with equivalent reference numerals, but without the media 8 shown. Here it is shown that printer 101 includes a second dancer arm 32 coupled to the dancer bar 12 at the second end and movable about a second pivot 34. In this example the printer 101 includes a second adjuster 36 coupled to the second dancer arm 32 to apply a second setting force to the second dancer arm 32 to set a net moment acting on the second dancer arm 32, and to adjust the second setting force to alter the net moment acting on the second dancer arm 32.

In this example, the second adjuster 36 is equivalent to the first adjuster 22, but in other examples a different second adjuster may be provided. Providing first and second dancer arms 14,32 at each end of the dancer bar 12 enables the dancer bar 12 to be more supported and to control tension more effectively across the length of the dancer bar 12 and therefore across the width of the media 8. Providing each of the dancer arms 14,32 with an adjuster allows for enhanced control across the length of the dancer bar 12 and therefore across the width of the media 8.

The example printer 101 includes sensors 15,35 for detecting a characteristic of the media 8, such as its material, quality or a deformation, and a controller 37 to adjust the first and second setting forces. In this example the controller 37 is integrated with a controller of the printer 101, but in other examples the controller may be a separate controller within the printer, or may be a separate external controller. This adjustment may be such that the respective net moments acting on the first and second dancer arms are equivalent. In some examples, the characteristic may be a property of the media itself, a property of the printer (for example, curing temperature) or a property of the ink. In this example, the sensors 15,35 are located in a region proximate to the dancer bar 12, but in other examples may be in any suitable location.

In some examples, in order to detect uniform deformations in the media, the printer 1 may print a fiducial marker onto the media 8. In some examples a single fiducial marker with a known dimension (for example, area, length or width) may be printed. The dimension of the fiducial marker may be detected, and a change in the dimension measured, once the media 8 has progressed through the printer 1.

If there is no change in the dimension, or a change which falls below a given threshold, this indicates that the media 8 has not substantially deformed and therefore that the tension exerted on the media 8 by dancer bar 12 can remain the same. In this case the weight 24 is not moved and the first and second setting forces are maintained. However, a change in the dimension, or a change above a predetermined threshold, indicates that the media 8 has deformed.

In order to reduce subsequent deformations in the media 8 as the media 8 progresses through the printer 1, the controller 37 instructs the weight 24 in both the first and second adjusters 22,36 to move relative to the first and second pivots 16,34, in dependence on the detected change, such that the net moment acting on the first and second dancer arms 14,32 is the same. The tension exerted by the dancer bar 12 is therefore adjusted uniformly along the length of the dancer bar 12 in order to correct for the detected deformation. In other examples, rather than measure the change in dimension of a fiducial marker, an expected detection time at a given vertical location may be known and an actual arrival time measured. If there is a difference, or a difference above a given threshold, between the expected and actual arrival times, this indicates a substantial deformation of the media. The controller 37 may then instruct the weight 24 as above in order to adjust the tension exerted by the dancer bar 12 uniformly along the length of the dancer bar 12.

In some examples, horizontally spaced fiducial markers are printed on the front or rear face of the media 8. In some examples the horizontally spaced fiducial markers are printed on opposite sides of the media, for example at a location at, or adjacent the opposed edges of the media. The relative initial positions on the fiducial markers when printed is known, and the relative positions of the fiducial markers is detected by the sensors 15,35 at a later time once the media 8 has moved through the printer 1.

A change in the relative position of the fiducial markers is indicative of a non-uniform deformation of the media 8 during printing, while no change in the relative position indicates the tension exerted by the dancer bar 12 is not creating a non-uniform deformation.

Should a change in the relative position of the fiducial markers be detected, the controller 37 adjusts the first and/or second setting forces based on the difference between the known relative initial positions of the fiducial markers and the detected relative positions to thereby reduce the non-uniform deformation. For example, the controller 37 may instruct the weight 24 in the first adjustment mechanism 22 to move a distance from the first pivot 16, and/or instruct the weight 24 in the second adjustment mechanism 22 to move a different distance from the second pivot 34. The extent to which the distances differ is dependent on the magnitude of the change detected. The tension exerted by the dancer bar 12 is therefore altered non-uniformly across the length of the dancer bar 12, thereby reducing non-uniform deformations in the media 8.

In some examples, a time at which the fiducial markers are expected to be detected by the sensors may be known, or determined, and the detected characteristic might be a difference, above a threshold, between the expected detection time and actual detection time. A uniform distortion of the media 8 is indicated if both fiducial markers are detected at the same time, either earlier or later than expected. In such a situation the weight in both the first and second adjusters 22,36 may be moved based upon the detected difference thereby adjusting the tension exerted by the dancer bar 12 uniformly across the length of the dancer bar 12. The adjustment may be such that the net moment acting on the first and second dancer arms 14,32 is the same, or is altered by the same amount.

A non-uniform distortion of the media 8 may be indicated if the difference, above a threshold, between the expected detection time and actual detection time for both fiducial markers is different. In such a situation the weight in either or both the first and second adjustment mechanisms 22,36 may then be moved a different distance away from the first and second pivots respectively 16, 34, in dependence on the detected difference, thereby adjusting the tension exerted by the dancer bar 12 non-uniformly across the length of the dancer bar 12.

Figure 4:
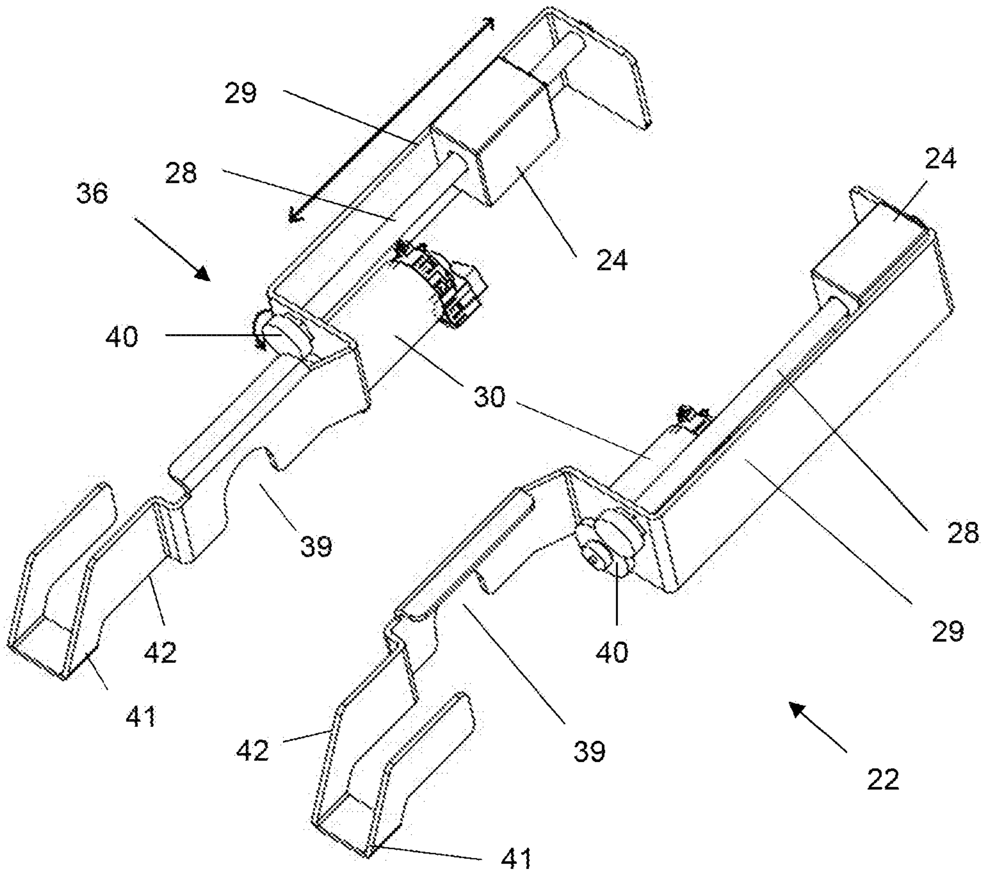
FIG. 4 shows an example pair of adjustment mechanisms for use in the example printer of FIG. 1.

FIG. 4 shows an example pair of first and second adjusters 22,36. The first and second adjusters 22,36 each include the movable weight 24. The movable weight 24 is coupled to the threaded bar 28 and is non-rotatable relative to the threaded bar 28 such that as the threaded bar 28 is rotated by a gear mechanism 40 operated by a motor 30, the weight 24 moves along the threaded bar 28. The threaded bar 28 passes through a housing 29 which forms part of a coupling mechanism 42 for releasably coupling the first and second adjustment mechanisms 22,36 to first and second dancer arms 14,32.

The housing 29 of this example is a flat U-shape, and the threaded bar 28 passes through the U-shape and is coupled at both ends to the housing such that the threaded bar 28 can rotate therein. One end of the threaded bar 28 is coupled to the gear mechanism 40 which is, in turn, coupled to the motor 30 for providing power thereto. The motor 30 may be coupled to a controller. The controller may instruct the motor 30 to rotate gear mechanism 40, thereby rotating the threaded bar 28 in order to move the weight relative to the housing 29. The weight 24 is a rectangular prism, a face of which abuts an inside face of the U-shaped housing thus preventing rotational movement of the weight 24 relative to the housing. As the weight 24 is unable to rotate relative to the housing, rotation of the threaded bar 28 results in movement of the weight 24 along the threaded bar 28, the direction of movement being dependent on the direction of rotation. Although the weight in this example is a rectangular prism, it may be any shape which interacts with the housing so as to restrict its rotation.

Coupling mechanism 42 is adapted such that they may be removably coupled to the first and second dancer arms. Coupling mechanism 42 has a recess 39 for positioning around the first or second pivot of the first or second dancer arm 14,32 respectively and a hanger 41 for supporting the first and second arm 14,32 respectively. The first and second adjustment mechanisms may therefore be retrofitted to a printer by fitting hangers 41 under and around the first and second dancer arms 14,32 and fitting the recess above the first and second pivots 16,34. The motor 30 may then be communicably coupled to a controller which is, in turn, coupled to sensors that detects deformation of the media. The controller may be the controller 37 described in FIG. 3 and the sensors may be the sensors 15,35 described in FIG. 3.

Figure 5:
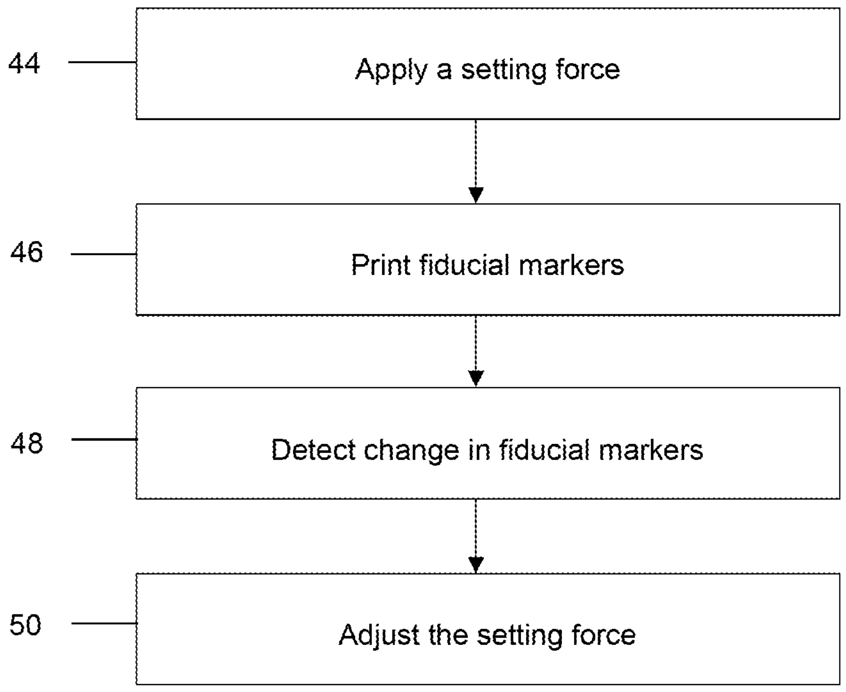
FIG. 5 shows a flowchart of an example method of controlling tension of a media during printing.

FIG. 5 shows an example method of controlling tension of media during printing, the media being tensioned by supporting a dancer bar, the dancer bar being coupled at a first end to a first dancer arm which moves about a first pivot and at a second end to a second dancer arm which moves about a second pivot, tension being provided by resisting a net moment acting on the first and second dancer arms.

The method includes applying 44 a first setting force to the first dancer arm to set the net moment acting on the first dancer arm and a second setting force to the second dancer arm to set the net moment acting on the second dancer arm. The first and second setting forces may be applied by coupling a moveable weight each to the first and second dancer arms, at a desired distance from the first and second pivots respectively. This may be done automatically in response to detected or inputted characteristics of the media or printer, or manually by a user. The first and second set net moments may be equivalent which may cause the dancer bar to exert a uniform tension on the media, it is also possible for the first and second set net moments to differ. If the weight of each moveable weight is equivalent, causing the first and second set net moments to be equivalent may be achieved by moving each weight the same distance from the first and second pivots.

The method further includes printing 46 two fiducial markers one on either side of the face of the media. The fiducial markers may be printed at either regular or irregular intervals throughout the printing process, and a location of each fiducial marker may be recorded. The fiducial markers may be any shape, for example a line, dot, QR code or a feature of the printed media itself. In other examples the fiducial markers may be pre-printed on the media. The method further includes detecting 48 the fiducial markers once they have progressed through the printer and measuring a change in location of the fiducial markers. A change in location of the fiducial markers from their expected location, either an absolute location, or relative to another marker, may be indicative that deformation of the media has occurred. The extent to which the position of the fiducial markers differs from the expected location is then used to calculate a desired change in net moment and thus a change in tension exerted by the dancer arm in order to reduce or avoid subsequent deformations.

The method further includes adjusting 50 the first and second setting forces to alter the net moment acting on the first and second dancer arms respectively. A controller may calculate the desired first and second setting forces to correct for, or reduce, the detected deformation based on the change in length of the fiducial markers, and instruct the first and second adjusters accordingly. Where the first and second adjusters comprise a moveable weight, the first and second setting forces may be adjusted by moving the weight relative to the first and second pivots respectively.

Figure 6:
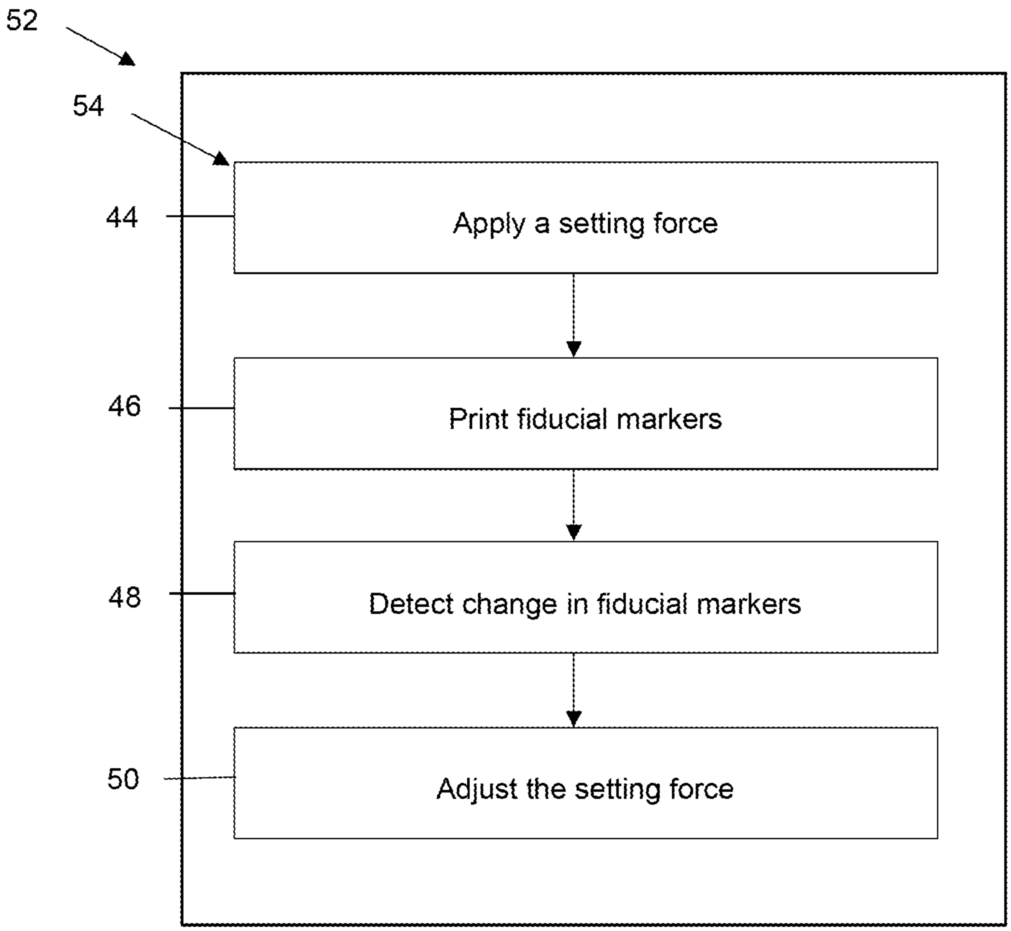
FIG. 6 shows an example of a non-transitory machine readable storage medium for instructing the method of controlling tension of a media during printing of FIG. 5.

FIG. 6 shows an example of a non-transitory machine readable storage medium 52. The non-transitory machine readable storage medium 52 encoded with instructions 54 executable by a processor to carry out the method of FIG. 5.

FIG. 7*a* shows an example of media 8 including fiducial markers 60,61 printed in a predetermined location. In this case the fiducial markers 60,61 are printed adjacent opposing edges of the media along a first axis 62 so that they are at the same longitudinal location on the media 8. The relative position of the fiducial markers is known and their position relative to the first axis is also known.

FIG. 7*b* shows an example of the media 8', fiducial markers 60',61' and first axis 62' after the media 8 has moved through the printer. In this example the first axis 62' is indicative of the expected position of the fiducial makers 60',61' and it can be seen that both fiducial markers 60,61 have move away from their expected position on that first axis 62'. It is also apparent that the relative position of the fiducial markers has changed with the fiducial marker 60' having moved further from the axis 62' than the fiducial marker 61'.

The deviation of both markers from their expected position may be indicative of a combination of uniform deformation of the media and the change in their relative positions may be indicative of a non-uniform deformation. In such a situation a controller receiving sensor data indicative of such a deviation from expected positions might alter the net moment on a dancer arm on each side of the dancer bar to reduce the net moment and thus try to reduce the deformation. In order to reduce the non-uniform deformation the net moment acting on the dancer arm on the side of the fiducial marker 60,60' may be reduced more than that acting on the dancer arm on the side of the fiducial marker 61,61'.

Although deformations have been discussed based on the comparing the location of fiducial markers with an expected position, or with other fiducial markers, it may be possible to detect deformations by directly detecting deviations in a dimension of fiducial markers themselves, or by using image sensors and analysing the printed image to detect deformation. Any deformations detected can be used as the basis for adjusting a net moment on dancer arm.

The invention claimed is:

1. A method of controlling tension of a media during printing, the media being tensioned by supporting a dancer bar coupled at a first end to a first dancer arm which moves about a first pivot, tension being provided by resisting a net moment acting on the first dancer arm, the method comprising:

applying a first setting force to the first dancer arm to set the net moment acting on the first dancer arm; and adjusting the first setting force by a first adjuster to alter the net moment acting on the first dancer arm during printing.

2. A method as claimed in claim 1, the media being tensioned by supporting a dancer bar coupled at a second end to a second dancer arm which moves about a second pivot, tension being provided by resisting a net moment acting on the second dancer arm, the method comprising:

applying a second setting force to the second dancer arm to set the net moment acting on the second dancer arm; and adjusting the second setting force by a second adjuster to alter the net moment acting on the second dancer arm during printing.

3. A method as claimed in claim 2, wherein the first and second setting forces are adjusted automatically based on a characteristic of the media.

4. A method as claimed in claim 3, wherein the characteristic of the media is detected, and the first setting force and/or second setting force are adjusted such that the respective net moments acting on the first and second dancer arms are the same.

5. A method as claimed in claim 3, wherein two horizontally spaced fiducial markers are printed onto the media, and the first setting force and/or second setting force are adjusted in dependence on the difference between relative initial positions of the fiducial markers and relative positions of the fiducial markers at a later time.

6. A method as claimed in claim 2, wherein the first and second setting forces are applied by coupling a moveable weight to the first and second dancer arm respectively, and the first and second setting forces are adjusted by moving the weight relative to the first and second pivots respectively.

7. A printer comprising:

a dancer bar;

a first dancer arm coupled to the dancer bar at a first end and movable about a first pivot; and a first adjuster coupled to the first dancer arm to apply a first setting force to the first dancer arm to set a net moment acting on the first dancer arm and to adjust the first setting force to alter the net moment acting on the first dancer arm during printing.

8. A printer as claimed in claim 7, wherein the first adjuster comprises a moveable weight and the first setting force is adjusted by moving the weight relative to the first pivot.

9. A printer as claimed in claim 8, wherein the movable weight is coupled to a threaded bar and is non-rotatable relative to the bar, such that as the bar is rotated by a gear mechanism operated by a motor, the weight moves along the threaded bar.

10. A printer as claimed in claim 9, wherein the printer further comprises:

a second dancer arm coupled to the dancer bar at a second end and movable about a second pivot; and a second adjuster coupled to the second dancer arm to apply a second setting force to the second dancer arm to set a net moment acting on the second dancer arm and to adjust the second setting force to alter the net moment acting on the second dancer arm.

11. A printer as claimed in claim 10, wherein the printer comprises a sensor for detecting a characteristic, and a controller for adjusting the first and second setting forces such that the respective net moments acting on the first and second dancer arms are equivalent.

12. A printer as claimed in claim 10, wherein the printer comprises a sensor for detecting relative differences between relative initial positions of two horizontally spaced fiducial markers printed onto the media and relative positions later on, and a controller for adjusting the first and second setting forces in dependence on the relative differences.

13. A printer as claimed in claim 12, wherein the first and second adjusters are removably coupled to the first and second dancer arms respectively.

14. A non-transitory machine-readable storage medium encoded with instructions executable by a processor and comprising instructions to:

apply a first setting force to a first dancer arm to set a net moment acting on the first dancer arm; and detect a characteristic of a media in a printer, the media being tensioned by a dancer bar coupled at a first end to the first dancer arm which moves about a first pivot, tension being provided by a net moment acting on the first dancer arm;

adjusting the first setting force by a first adjuster to alter the net moment acting on the first dancer arm during printing based upon the detected characteristic.

15. The non-transitory machine-readable storage medium as claimed in claim 14 further comprising instructions to:

apply a second setting force to a second dancer arm to set a net moment acting on the second dancer arm; and detect a characteristic of a media in a printer, the media being tensioned by a dancer bar coupled at a second end to the second dancer arm which moves about a second pivot, tension being provided by a net moment acting on the second dancer arm;

adjusting the second setting force by a second adjuster to alter the net moment acting on the second dancer arm during printing based upon the detected characteristic.

* * * * *